US007623286B2

(12) United States Patent
Vestal et al.

(10) Patent No.: US 7,623,286 B2
(45) Date of Patent: Nov. 24, 2009

(54) SYSTEM AND METHOD FOR DISPLAYING IMAGES

(75) Inventors: Gregory Scott Vestal, McKinney, TX (US); Harold E. Bellis, II, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 282 days.

(21) Appl. No.: 11/361,247

(22) Filed: Feb. 24, 2006

(65) Prior Publication Data

US 2007/0200806 A1 Aug. 30, 2007

(51) Int. Cl.
*G02B 26/00* (2006.01)

(52) U.S. Cl. ....................................... 359/291; 359/290

(58) Field of Classification Search ................. 359/291, 359/259, 239, 237
See application file for complete search history.

(56) References Cited

U.S. PATENT DOCUMENTS 5,706,061 A * 1/1998 Marshall et al. ............. 348/743
5,917,558 A 6/1999 Stanton
6,535,187 B1 * 3/2003 Wood .......................... 345/84
7,055,966 B2 * 6/2006 Momose et al. ............... 353/97
7,429,983 B2 * 9/2008 Islam ......................... 345/204
2006/0250336 A1 * 11/2006 Wood .......................... 345/84

* cited by examiner

*Primary Examiner*—Timothy J Thompson
(74) *Attorney, Agent, or Firm*—Charles A. Brill; Wade James Brady, III; Frederick J. Telecky, Jr.

(57) ABSTRACT

System and method for enhancing image quality in a display system. A preferred embodiment comprises a variable light source capable of producing a light of specified intensity and color, an array of light modulators optically coupled to the variable light source, the array to modulate the light based upon image data to display images on a display plane, a controller coupled to the array, the controller to issue commands to control the array, and a light driver circuit coupled to the variable light source and the controller, the light driver circuit to provide a signal to the variable light source to specify the intensity of the light produced by the variable light source, when there is a change in a color of light being displayed or when a change in a weight of the image data to be displayed requires less light to be displayed than a current output level.

5 Claims, 5 Drawing Sheets

SYSTEM AND METHOD FOR DISPLAYING IMAGES

TECHNICAL FIELD

The present invention relates generally to a system and a method for displaying images, and more particularly to a system and a method for enhancing image quality in a display system.

BACKGROUND

Display systems using spatial light modulators use a light source to provide a light that is used to project images onto a display plane. The light source may comprise a single, wide-band light source used in conjunction with color filters to produce light of desired colors. For example, in a three-color display system, color filters may be used to produce light in red, green, and blue wavelengths. In display systems that use other color combinations, different color filters can be used to provide the desired colored light. Alternatively, the light source may comprise multiple, narrow-band light sources that are selected to produce light of desired colors. For example, a three-color display system can include three light sources, with a first light source producing red wavelength light, a second light source producing blue wavelength light, and a third light source producing green wavelength light. Similarly, display systems using a different number of colors will have a different number of color filters or colored light sources.

The chromatic characteristics of the display system, such as the white point, color temperature, and so forth, are determined by the characteristics of the light source in a single light source display system or the individual light sources in a multiple light source display system as well as the color filter in display systems that use the color filter. For example, in a display system that makes use of a color filter, the color filter can be specified by the wavelength characteristics of the individual color filters as well as each individual color filter's transmissivity. Once implemented in the display system, the chromatic characteristics of the display system cannot normally be drastically changed. However, electronic techniques can be used alter the chromatic characteristics of the display system in small degrees.

In addition to correct chromatic characteristics, another factor in the perceived quality of the display system is the display system's bit-depth. The bit-depth of a display system is a logarithmic value of a ratio of a brightest displayable gray shade to a dimmest displayable gray shade of the display system, with a larger bit-depth typically indicating an ability to display a better appearing image. One technique used to increase the bit-depth of a single light source display system is to include a filter that attenuates the brightness of the light projected by the display system onto the display plane. An example of this filter is a neutral density filter. The neutral density filter will typically be used only on the least significant bits (the smallest amounts of light) for a given color, reducing the smallest amounts of light by an additional amount, and thereby decreasing the brightness of the dimmest displayable gray shade and hence, increasing the ratio of brightest displayable gray scale to dimmest displayable gray scale. Another technique to increase a display system's bit-depth is to shorten a shortest displayable amount of light. By reducing the time that a light is projected onto a display plane, the effective amount of light displayed is reduced, thereby reducing the brightness of the dimmest gray scale.

With reference now to FIG. 1*a*, there is shown a diagram illustrating a color filter 105 for use in a three-color display system with a light source that produces a wide-band light. The color filter 105 is in the shape of a disc with multiple filters, such as a blue filter 110, a green filter 111, and a red filter 112, arranged around its perimeter. As shown in FIG. 1*a*, the color filter 105 has two filters per color with the filters arranged in a repeated red, green, and blue sequence. As the color filter 105 rotates, one of the filters will always be in front of the light source, filtering the light produced by the light source and producing a light with the chromatic characteristics of the filter. The size of the individual filters, as well as other chromatic characteristics, can be adjusted in order to produce a white light with a desired color point when illuminated with a particular light source. As shown in FIG. 1*a*, there are two filters per color and the two filters of a given color may be identical to each other or they can be different.

With reference now to FIG. 1*b*, there is shown a diagram illustrating a color filter 125 for use in a three-color display system with a light source that produces a wide-band light. The color filter 125, like the color filter 105 (FIG. 1*a*), has two filters per color, such as a blue filter 110, a green filter 111, and a red filter 112. In addition to the six filters, the color filter 125 also includes a neutral density filter 130 for the color green. Since the brightness of the color green has the greatest effect on the overall brightness of the display system, a neutral density filter may be used only for the color green. The neutral density filter can be used to decrease the brightness of the color green and therefore decrease the brightness of the dimmest displayable grayscale. Generally, the addition of neutral density filters for the colors red and blue would only result in an overall reduction in the size of the other color filters in the color wheel, while yielding marginal results. The size of the individual filters in the color wheel 125 are not drawn to scale.

With reference now to FIG. 1*c*, there is shown a time-space diagram illustrating light output and color filter state for a single frame of a three-color display system using a color filter, such as the color filter 105 (FIG. 1*a*). The time-space diagram shown in FIG. 1*c* illustrates light output and color filter state for a single frame duration (span 160). Depending upon the display system, a single frame can comprise two sub-frames (span 165 and span 166) wherein two slightly different images are displayed within a single frame to increase the effective resolution of the display system. The color filter 105 is rotated in front of a light source to provide the desired colors of light, with the order of the sequence of colors being dictated by the order of color filters in the color filter. For example, the rotation of the color filter 105 in a counter-clockwise direction can produce a sequence of blue 170, red 171, and green 172 colors. The speed of the rotation of the color filter can determine the number of times the color sequence appears within a frame (or sub-frame) duration. As shown in FIG. 1*c*, the blue 170, red 171, and green 172 color sequence appears within a sub-frame duration three times, so the speed of the color filter 105 is referred to as 3 times or 3×. Also shown in the FIG. 1*c* is the light output of the light source of the display system. Since the display system does not modulate the light output of the light source, the light output of the light source remains at 100 percent (line 175) during the frame (or sub-frame) duration. Although the diagram displayed in FIG. 1*c* illustrates a display system that utilizes two sub-frames within a single frame, the operation of the color filter 105 would substantially be the same in a display system that does not utilize sub-frames.

One disadvantage of the prior art is that the use of electrical techniques to adjust the color point of the display system can only make small changes to the color point of the display system. Furthermore, the use of the electrical techniques will tend to decrease the overall brightness of the display system, which can negatively impact the image quality of the display system.

Another disadvantage of the prior art is that the presence of the neutral density filter on the color wheel (such as the color wheel 125 (FIG. 1*b*)) can reduce the overall size of the other color filters on the color wheel. This will reduce the overall ability of the display system to produce the other necessary colors of the display system and thereby negatively affect the image quality of the display system. For example, the presence of the neutral density filter can reduce the overall brightness of the display system and affect the quality of the images being displayed. Furthermore, a single neutral density filter will only be able to provide a single fixed attenuation of the light. To add additional levels of light attenuation will require additional neutral density filters, which will future reduce the size of the other color filters on the color wheel.

SUMMARY OF THE INVENTION

These and other problems are generally solved or circumvented, and technical advantages are generally achieved, by preferred embodiments of the present invention which provides a system and a method for enhancing image quality in a display system.

In accordance with a preferred embodiment of the present invention, a method for displaying image data is provided. The method includes determining that a change in a light source output is needed when there is a change in the color of light being displayed or when there is a change in a weight of the image data to be displayed. The method also includes adjusting the light source output in response to the determining and illuminating an array of light modulators with the light source output. The method further includes setting light modulators in the array of light modulators based on the image data.

In accordance with another preferred embodiment of the present invention, a method for displaying an image in a display system is provided. With image including more than one set of image data. The method includes determining that a change in a light source output is needed when there is a change in the color of light being displayed or when there is a change in a weight of the image data to be displayed and adjusting the light source output in response to the determining. The method also includes illuminating an array of light modulators with the light source output and setting light modulators in the array of light modulators based on the image data. The method further includes repeating the adjusting and the setting in response to a determination that an additional set of image data is to be displayed.

In accordance with another preferred embodiment of the present invention, a display system is provided. The display system includes a variable light source that is capable of producing a light of specified intensity and color, an array of light modulators, a controller coupled to the array of light modulators, and a light driver circuit coupled to the variable light source and the controller. The array of light modulators modulates the light produced by the variable light source based upon image data to display images on a display plane and the controller issues commands to control the operation of the array of light modulators. The light driver circuit provides a signal to the variable light source to result in the variable light source to produce a light of the specified intensity, when there is a change in a color of light being displayed or when a change in a weight of the image data to be displayed requires an amount of light to be displayed that is less than a current output level.

An advantage of a preferred embodiment of the present invention is that the display system's color point can be readily changed without negatively affecting the overall brightness of the display system. Furthermore, significant changes to the color point of the display system can be made without requiring a different color filter, which would enable real-time changes to the color point without requiring mechanical intervention.

A further advantage of a preferred embodiment of the present invention is that it allows for the attenuation of one or more colors of light to increase the bit-depth of the display system. Furthermore, the attenuation be made when needed as well as to a degree needed, rather than a fixed degree of attenuation at a fixed time interval for a fixed color as would be dictated by a color filter.

Yet another advantage of a preferred embodiment of the present invention is that in display systems requiring a color wheel, the individual color filters can be maximized in size with maximum transmissivity. This will maximize the brightness of the display system and improve image quality.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a three-color display system making use of a digital micromirror device (DMD). The invention may also be applied, however, to other display systems, such as those that make use of more than three colors or display systems using other technologies of light modulators, such as deformable mirrors, liquid crystal display, liquid crystal on silicon, and so forth. Furthermore, the invention can be applied to display systems using a variety of light sources, such as those utilizing wideband light sources, narrow band light sources, constantly on light sources, rapid switching light sources, and so forth.

When fixed light output light sources are used, individual filters of a color filter may require different degrees of transmissivity to produce a desired color point for the display system. However, the use of a light source with a light output that can be changed over time can eliminate the need for a color filter with individual filters with different degrees of transmissivity. When the light output can be changed, the light output can be used to set the desired color output.

Figure 1A:
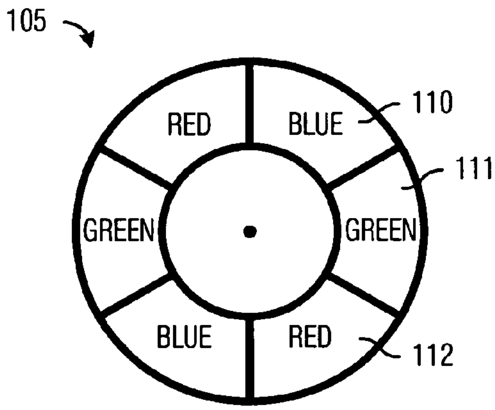
FIGS. 1*a* through 1*c* are diagrams of exemplary color filters and light output and color filter state for a single frame of a three-color display system.
Figure 1B:
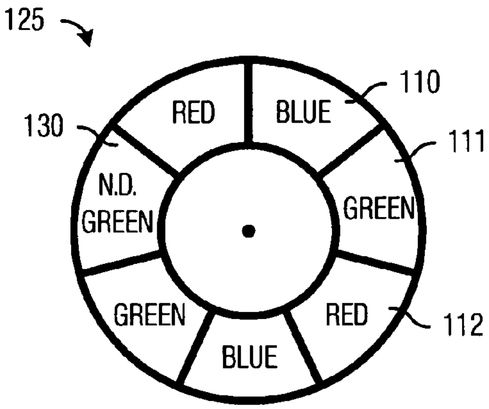
Figure 1C:
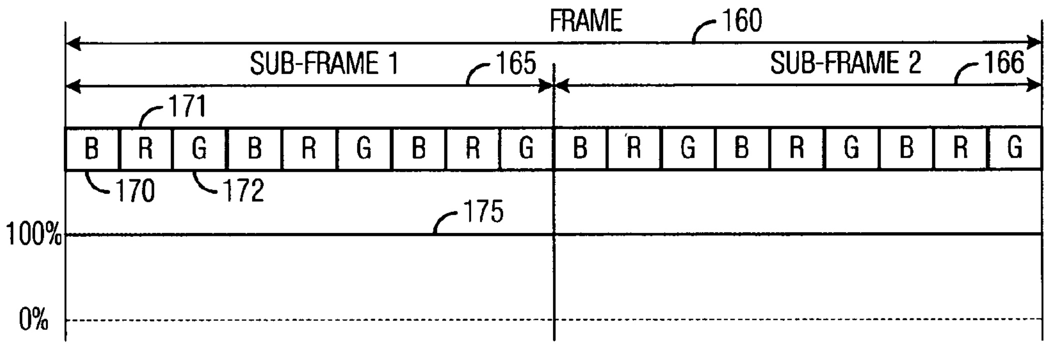
Figure 2A:
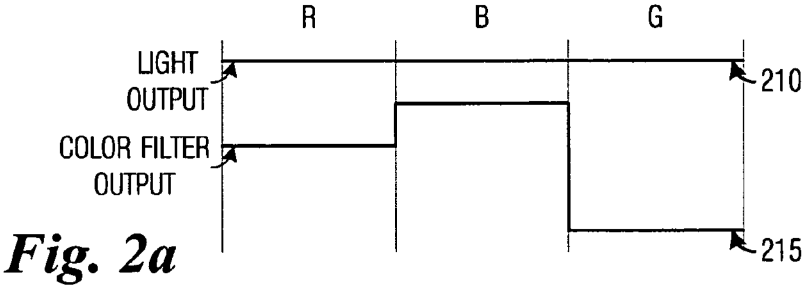
FIGS. 2*a* and 2*b* are diagrams of light output and color filter output for display systems with a fixed light source and a variable light source, according to a preferred embodiment of the present invention.

With reference now to FIG. 2*a*, there is shown a diagram illustrating light output and color filter light output for a display system having a color filter with individual filters with different degrees of transmissivity and utilizing a fixed light output light source, according to a preferred embodiment of the present invention. The diagram shown in FIG. 2*a* illustrates the light output of a light source for a display system and the color filter light output for a three-color display system. Although the diagram illustrates the light output for a three-color display system, similar illustrations can be had for display systems utilizing different numbers of colors.

The display system utilizes a light source with a fixed light output, therefore, over the entire three-color sequence (red, blue, and green), the light output (shown as line 210) remains constant. Since the light output of the light source remains constant, the individual filters of the color filter used in the display system can be adjusted to provide a desired color point. For example, since green is the color that most affects the brightness of images displayed on the display plane, the green filter may have a lower transmissivity so that the images do not have a green cast. A stepped line 215 illustrates the color filter output for the display system.

Figure 2B:
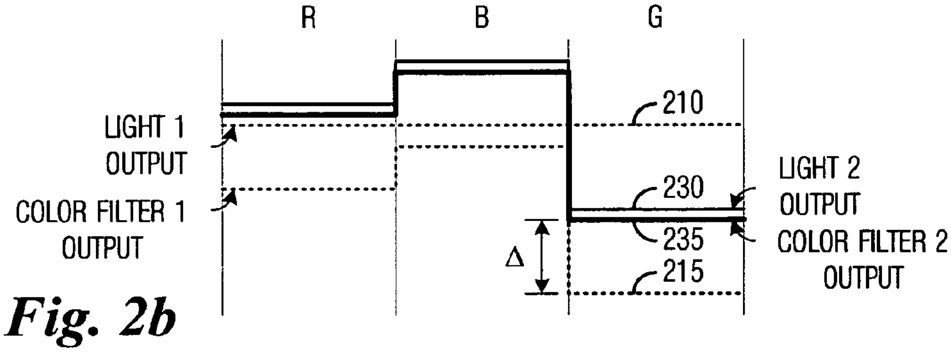

With reference now to FIG. 2*b*, there is shown a diagram illustrating light output and color filter output for a display system having a color filter and utilizing a variable light output light source (variable light source), according to a preferred embodiment of the present invention. The display system utilizes a variable light source that is responsive to control instructions from a light driver circuit (not shown). Examples of variable light sources may be AC arc lamps, DC arc lamps, light emitting diodes (LED), lasers, and so forth. Since the light output of the light source can be varied, it is possible to utilize a color filter with individual filters designed for maximum transmissivity. The use of individual filters with maximum transmissivity will reduce light loss due to the color filter and can increase the brightness of the display system.

The diagram shown in FIG. 2*b* illustrates the light output (dashed line 210) and color filter output (dashed, stepped line 215) from an exemplary display system with a light output that is fixed, such as shown in FIG. 2*b*. However, since a variable light source is capable of producing a variable light output, the output of the variable light source can be adjusted to provide a desired color point (determined in consideration with the chromatic characteristics of the light source and the color filter). Therefore, the light output of the variable light source, shown as stepped line 230, can differ for each of the three colors utilized in the display system. In display systems that use more than three colors, the light output of the variable light source can have a similar appearance. A consideration when using variable light sources is that the overall light output of the variable light source should not exceed the capabilities of the light source, to optimize performance and useful life. Therefore, an average of the light output of the variable light source should be substantially equal to the rated ability of the light, with the averaging occurring over some given amount of time, such as a sub-frame, a frame, or several frames.

Since the color filter is designed for maximum transmissivity, each of the individual filters will transmit as much light as possible. The color filter light output is shown as stepped line 235. Comparing the color filter output of the display system with a variable light source (stepped line 235) with the color filter output of the display system with a fixed light source (dashed, stepped line 215), a relationship between the different colors (red, green, and blue) are consistent in both color filter outputs, but the color filter output of the display system with a variable light source is significantly higher (brighter) than the color filter output of the display system with a fixed light source. This means that the resulting images from the two display systems will have substantially the same color point but the images from the display system with the variable light source will be brighter.

With reference now to FIGS. 3*a* through 3*g*, there are shown time-space diagrams illustrating exemplary light output waveforms for a display system with a variable light source, according to a preferred embodiment of the present invention. The diagrams shown in FIGS. 3*a* through 3*g* illustrate exemplary light output waveforms for a display system with a variable light source for a single frame that comprises two sub-frames. Although shown for a display system that utilizes sub-frames, similar light output waveforms are possible for a display system that uses only frames.

Figure 3A:
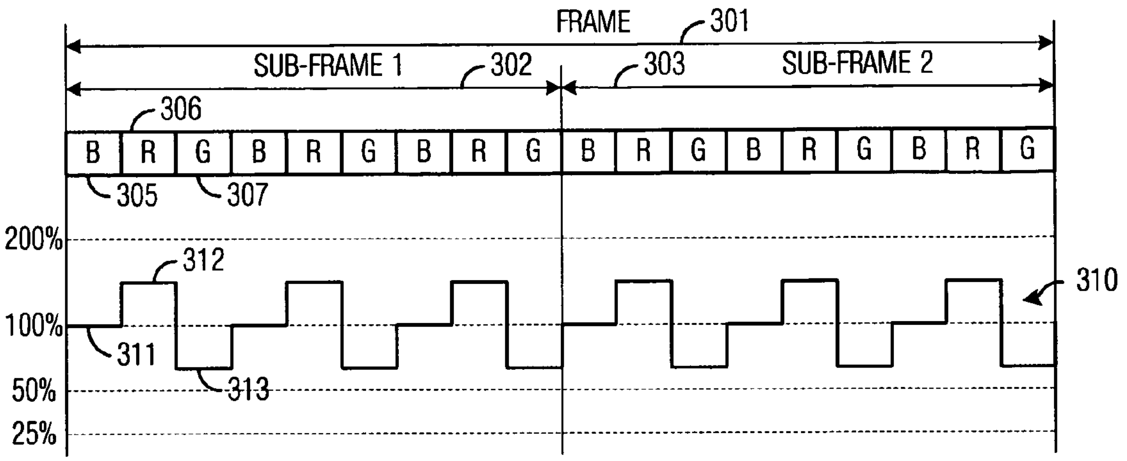
FIGS. 3*a* through 3*g* are diagrams of exemplary light output waveforms, according to a preferred embodiment of the present invention.

The diagram shown in FIG. 3*a* illustrates color filter-state and light output for a single frame duration (shown as span 301), wherein the single frame comprises two sub-frames (shown as sub-frame 1 (span 302) and sub-frame 2 (span 303)). Each sub-frame, for example, sub-frame 1, has sufficient duration for the color filter to complete three cycles, with each color filter state shown in FIG. 3*a* as a lettered block, such as block B 305 representing color filter state blue, block R 306 representing color filter state red, and block G 307 representing color filter state green. Also shown in FIG. 3*a* are dashed horizontal lines representing different light output levels, with dashed horizontal lines representing light output levels of 200%, 100%, 50%, and 25%, wherein the percentages are relative to a rated light output level of the variable light source. The spacing of the dashed horizontal lines representing light output is not to accurate scale and is intended for illustrative purposes only.

A first light output waveform 310 illustrates the light output of the variable light source. While the light output remains constant for the duration of a single color filter state, the light output varies for the different color filter states. For example, while the color filter is in the blue state (block B 305), the light output is at about 100% (shown as step 311), when the color filter is in the red state (block R 306), the light output is at about 150% (shown as step 312), and when the color filter is in the green state (block G 307), the light output is at about 65% (shown as step 313). The light output values shown in FIG. 3*a* are exemplary values and are not meant to imply any preferred values. However, the light output level for each time that the color filter is in the same state is substantially equal. An average of the first light output waveform 310 should be approximately equal to the 100% light output level. This form of light output waveform is referred to as variable plateau.

Figure 3B:
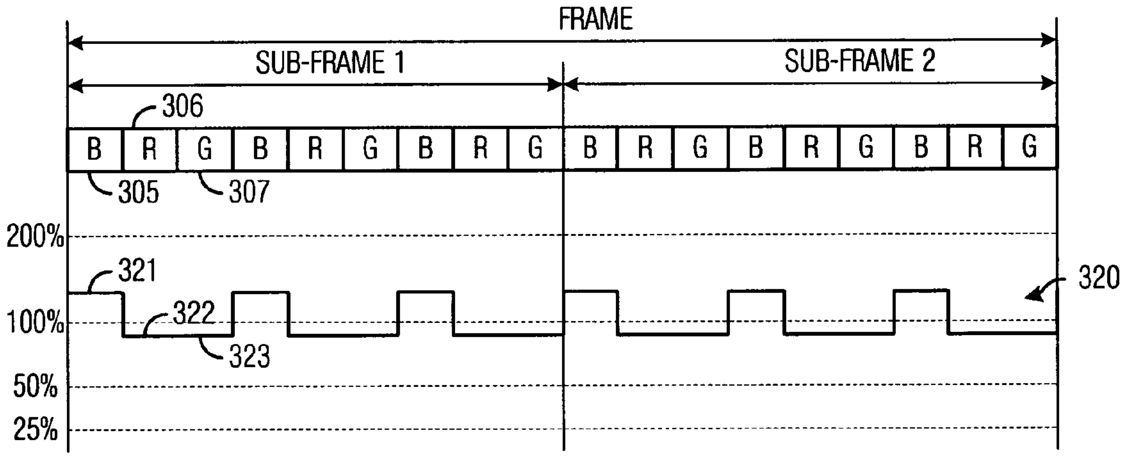

The diagram shown in FIG. 3*b* illustrates a second light output waveform 320. The second light output waveform 320 is referred to as a boosted color waveform, wherein the light output for a single color is boosted while the light output for remaining colors remain the same. For example, the second light output waveform 320 has a boosted blue color (shown as step 321), wherein the light output is boosted while the color filter is in the blue state (block B 305) and the light output remains constant (shown as steps 322 and 323) while the color filter is in the red state (block R 306) and the green state (block G 307). The boosting of the light output during a color filter state can be used to cure a light source that is deficient in a certain color or to reduce an overall duration of a color filter state (hence reduce the particular color filter's size in the color wheel and increase the size of the remaining color filters), for example. Although shown as boosting the light output during the blue color filter state, the boosting of a single color of light can occur for any of the colors used in a display system. Due to the need to have the average light output be substantially equal to the rated light output level of the variable light source, the light output while the color filter is in the blue state and the green state may actually be lower than if a fixed output light source was used. However, the performance gains achieved by using the variable light source, such as improved color point, overall greater image brightness, and so forth, outweighs the slightly reduced light output levels during the red and green color filter states.

Figure 3C:
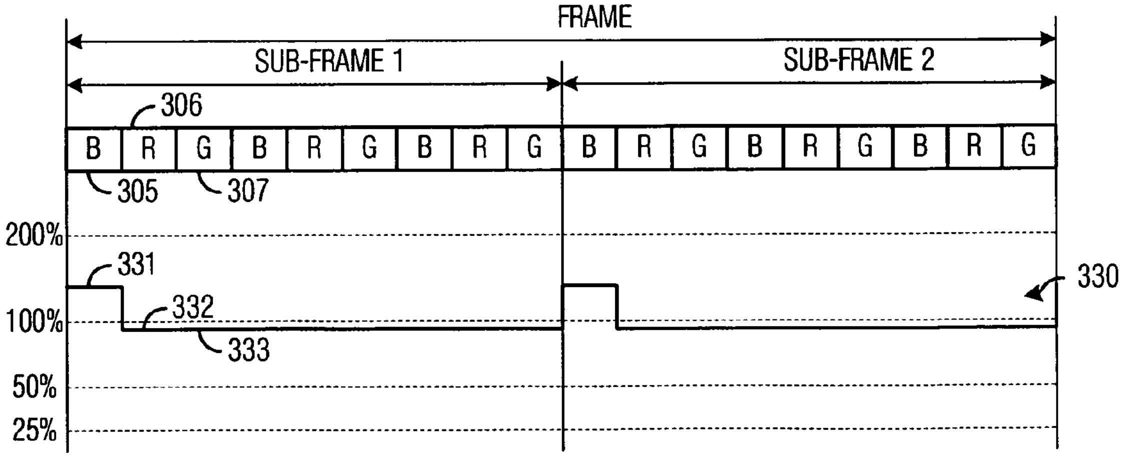

The diagram shown in FIG. 3*c* illustrates a third light output waveform 330. The third light output waveform 330 shows a boost of light output from the variable light source during a single color filter state for an entire sub-frame (an entire frame if the display system does not use sub-frames). As shown in FIG. 3*c*, the light output of the variable light source is boosted while the color filter is in its initial blue state (block B 305), shown as step 331. After the end of the initial blue state, the light output of the variable light source drops back to normal, for example, step 332 and step 333 illustrate light output levels when the color filter is in a red state (block R 306) and a green state (block G 307). The boosting of a single instance of a color filter state can enable a smaller degree increase than what is achievable using the second light output waveform 320 (FIG. 3*b*). Again, although shown as boosting the light output during the blue color filter state, the boosting of a single color of light can occur for any of the colors used in a display system.

Figure 3D:
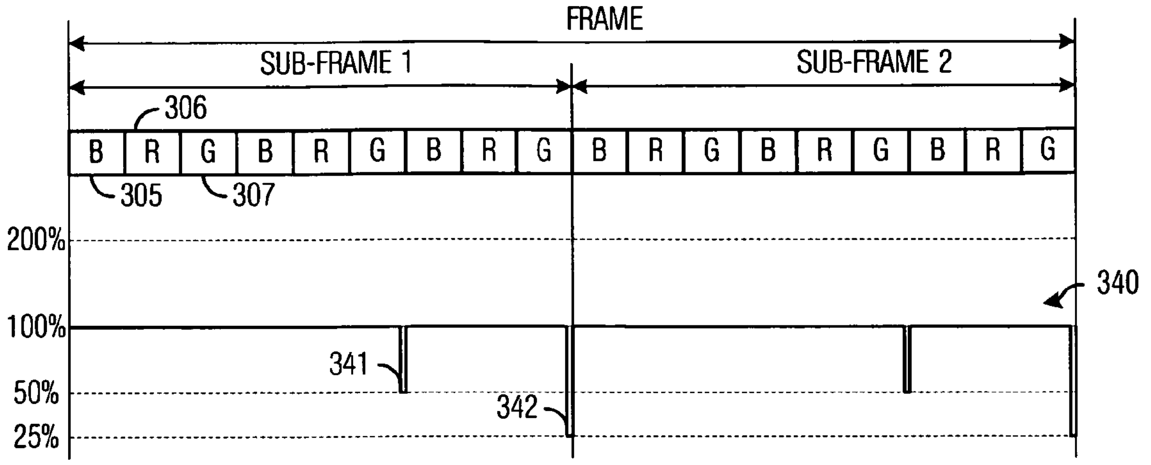

The diagram shown in FIG. 3*d* illustrates a fourth light output waveform 340. The fourth light output waveform 340 shows the use of reductions in the light output to increase the bit-depth of a display system. Reductions in the light output can be referred to as negative pulses. The negative pulses can increase the bit-depth of a display system by effectively reducing the minimum amount of light displayable by the display system. To obtain a one-bit increase in the bit-depth of a display system, the minimum amount of light needs to be halved, while a two-bit increase in the bit-depth requires that the minimum amount of light be quartered. The fourth light output waveform 340 illustrates two reductions in the light output of a light source, a first negative pulse 341 is a one-half reduction in the light output and a second negative pulse 342 is a three-quarter reduction in the light output. The second negative pulse 342 enables a two-bit increase in the bit-depth of the display system.

As shown in FIG. 3*d*, the negative pulses 341 and 342 occur during a green color state of the color filter. However, negative pulses can occur during any color state of the color filter. Additionally, the duration of the negative pulses 341 and 342 are short compared to the duration of a color state. This is due to the fact that a contributing factor of providing the minimum amount of light is the amount of time that the light is shown on the display plane, with the shorter the amount of time the light is shown, the less the amount of light appears on the display plane.

Figure 3E:
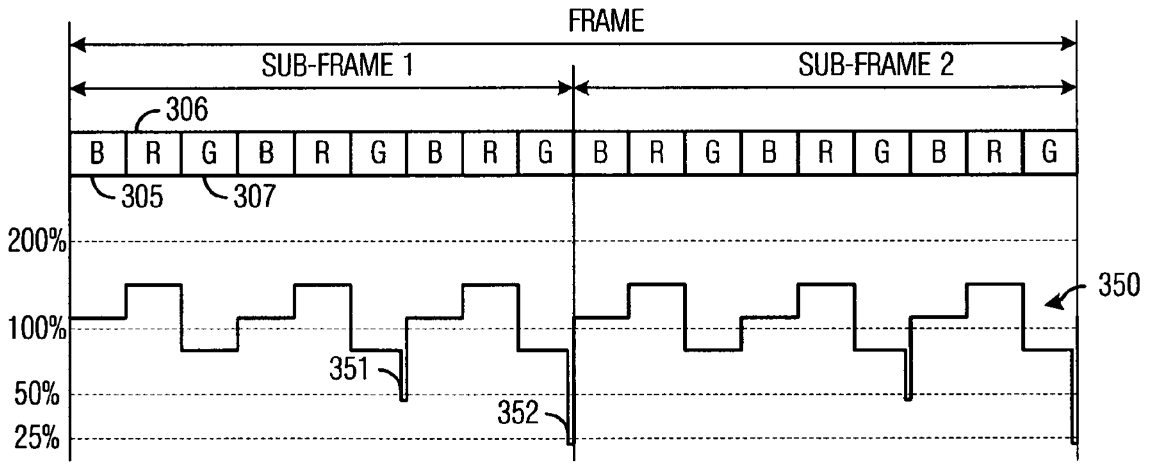
Figure 3F:
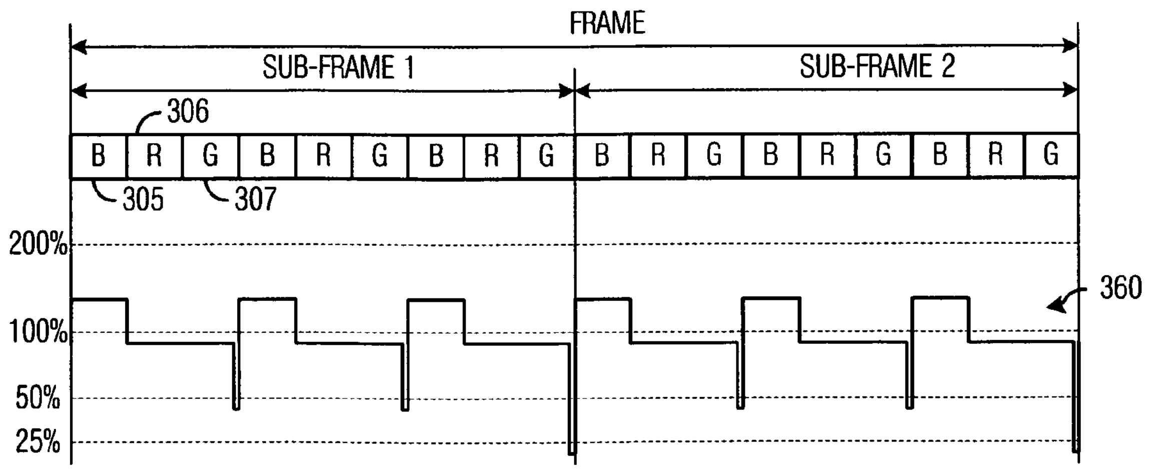
Figure 3G:
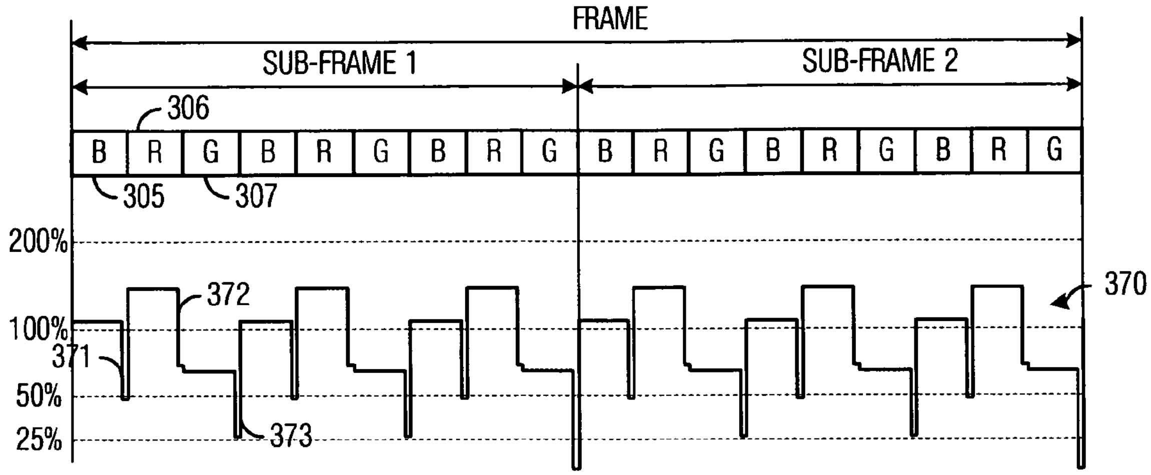

The diagram shown in FIG. 3*e* illustrates a fifth light output waveform 350. The fifth light output waveform 350 illustrates a combination of a variable plateau waveform with negative pulses. Again, two negative pulses are shown in FIG. 3*e*, a first negative pulse 351 is a one-half light output negative pulse and a second negative pulse 352 is a one-quarter light output negative pulse. Similarly, the diagram shown in FIG. 3*f* illustrates a sixth light output waveform 360, wherein a combination of a single boosted color waveform is combined with negative pulses. As shown in FIG. 3*f*, negative pulses can be present in each color state of a single color. The diagram shown in FIG. 3*g* illustrates a seventh light output waveform 370, wherein negative pulses are present in each color state of the color filter. For example, negative pulse 371 occurs when the color filter is in a blue state, negative pulse 372 occurs when the color filter is in a red state, and negative pulse 373 occurs when the color filter is in the green state. Although the diagram in FIG. 3*g* illustrates a negative pulse in every color filter state, it is possible to have negative pulses in some color filter states and not have negative pulses in some other color filter states. The use of negative pulses can be dependent upon desired performance criteria for the display system.

Figure 4:
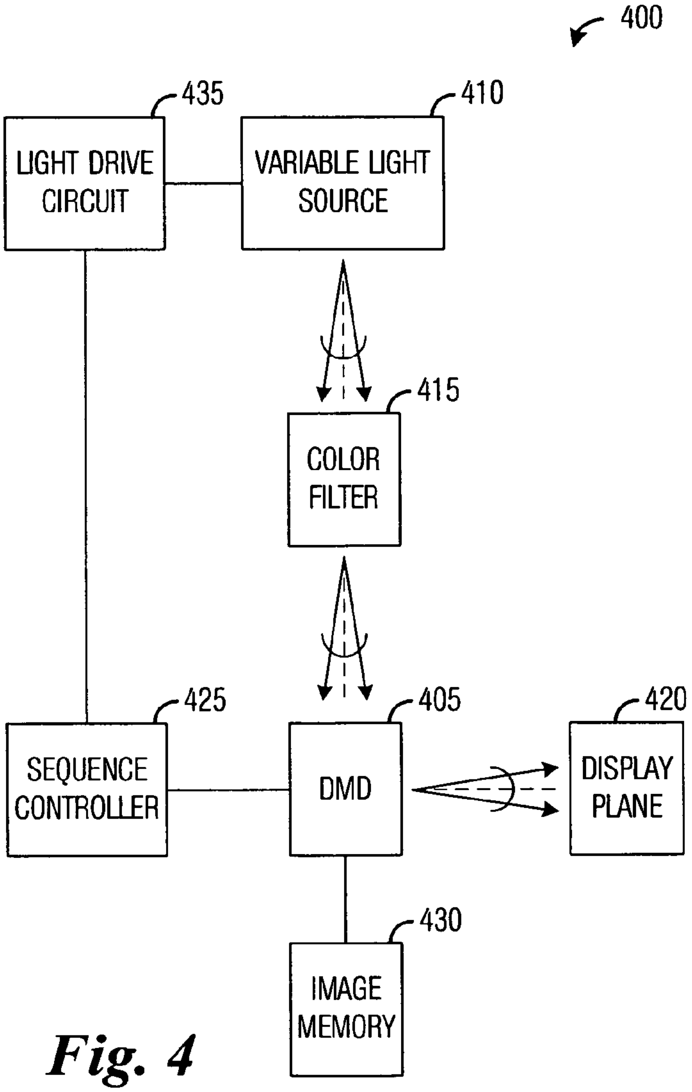
FIG. 4 is a diagram of an exemplary display system with a variable light source, according to a preferred embodiment of the present invention.

With reference now to FIG. 4, there is shown a display system 400, wherein the display system has a variable output intensity light source, according to a preferred embodiment of the present invention. The display system 400 includes an array of light modulators, namely a DMD 405, that is used to modulate light from a variable light source 410. In addition to DMDs, other arrays of light modulators may include deformable micromirrors, liquid crystal displays, liquid crystal on silicon, micro electromechanical systems (MEMS), and so on. The variable light source 410 may either be a wide-band light source, such as a DC arc lamp or an AC arc lamp, and so forth, or a narrow-band light source, such as an LED, phosphor coated LED, laser, and so on. A wide-band light source may require the use of a color filter 415 in order to provide the desired colors to the DMD 405, while a narrow-band light source may need to use a plurality of different narrow-band lights to provide the desired colors. Light, modulated by the DMD 405, can project onto a display plane 420 for viewing purposes.

Controlling the operation of the DMD 405 can be a sequence controller 425, which can be responsible for issuing image data display commands to the DMD 405, synchronizing the operation of the DMD 405 to the color filter 415, loading image data stored in an image memory 430 into the DMD 405, and so on, as well as provide light control commands to cause the variable light source 410 to change its light output level, select which lamp to turn on (in a situation where the variable light source comprises multiple lamps), and so forth. The sequence controller 425 can control the light output level of the variable light source 410 by issuing commands to a light drive circuit 435. The light drive circuit 435 can have stored in an internal memory or an external memory (neither shown) a description of the light output waveform that the variable light source 410 should produce. As needed, the light drive circuit 435 can change the light output of the variable light source 410 by changing a current that it is providing to the variable light source 410, for example.

The sequence controller 425 can issue commands (or signals) to the light drive circuit 435 to inform the light drive circuit 435 of changes to the color filter state as the color filter 415 cycles through its states. The light drive circuit 435 can use the commands (or signals) to synchronize its timing of changes to the light output level of the variable light source 410. Alternatively, the sequence controller 425 can issue a single command (or signal) to the light drive circuit 435 once per frame (or sub-frame), for example, at the beginning of the frame, to provide timing information to the light drive circuit 435 to help ensure that synchronization is maintained.

The nature of the current being provided to the variable light source 410 can be dependent upon the type of lamp(s) used in the variable light source. For example, if the lamp is an AC arc lamp, then an average of the current being used to drive the lamp should conform to a rated current specification of the lamp, while if the lamp is a DC arc lamp, the current provided to the lamp should be such that the light output of the lamp conforms to the rated light output specification of the lamp. Since the drive current can vary depending upon the type of lamps used, it is preferred that an average of the light output of the variable light source 410 be substantially equal to the rated light output of the lamp. The average may be over a sub-frame, a frame, or multiple frames.

Altering a current to the variable light source 410 can be an effective way to vary the light output of the variable light source 410 when arc lamps (both DC and AC), LEDs, or lasers are used. However, in an alternate implementation of the variable light source 410, wherein rapid switching lamps are used in the variable light source 410, the light drive circuit 435 can change the light output of the variable light source 410 by turning on lamps previously off (to increase light output) or turning off lamps previously on (to decrease light-output) in the variable light source 410.

Instead of storing the light output waveform and having the light drive circuit 435 responsible for determining a proper light output of the variable light source 410, the sequence controller 425 can be programmed with desired light output levels for particular weightings and color of image data being loaded into the DMD 405 and the sequence controller 425 can provide information regarding the desired light output level to the light drive circuit 435, which could then change the light output of the variable light source 410, if necessary.

In a display system that uses multiple arrays of light modulators, such as a multi-DMD display system (or an LCD display system) where each color of light has a dedicated DMD and a fixed color filter is used to provide desired colored light for each DMD, then adjustments to the light output intensity may be limited to the use of negative pulses to increase the bit-depth of the display system, since boosting of the light output of the light source could change the color point of the display system because the boosting of the light output would change the brightness of each color of light. This can be remedied by using a different light source for each color of light.

Figure 5A:
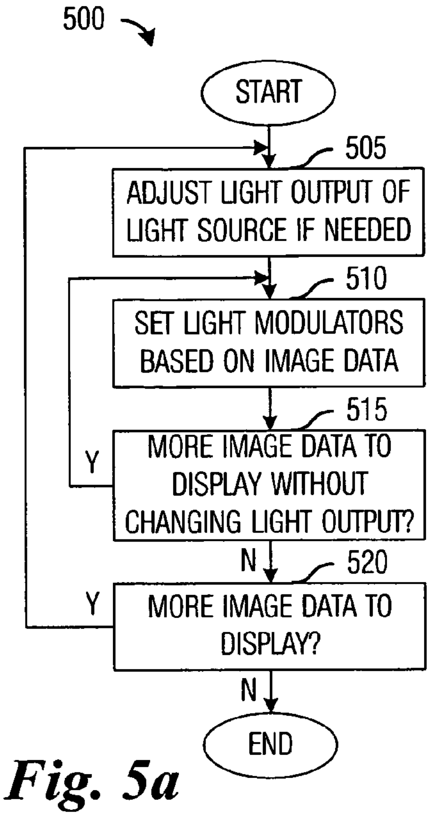
FIGS. 5*a* through 5*d* are diagrams of sequences of events in the displaying of image data in a display system with a variable light source, according to a preferred embodiment of the present invention.

With reference now to FIG. 5*a*, there is shown a diagram illustrating a sequence of events 500 in the displaying of image data in a display system with a variable light source, according to a preferred embodiment of the present invention. The sequence of events 500 can describe the events taking place in the displaying of image data in a display system, wherein an image being displayed in the display system can be decomposed into a sequence of bit planes for each of the colors used in the display system. Each bit plane for each color needs to be displayed by the display system in order to properly display the image. Depending upon the design of the display system, for example, to maximize image quality by reducing color flicker and noise, the displaying of the image data may not occur in increasing or decreasing order of the bit planes, nor may an entire bit plane be displayed at a single time. Regardless, the sequence of events 500 generally applies to any ordering of the image data.

The sequence of events 500 can begin with an adjustment to the light output of the light source if needed (block 505). A change in light output may be needed when a new bit plane is being displayed or when a change occurs in the color filter state. For example, if image data associated with the red colored light is being displayed, then the light output should be changed to a level associated with the color red. The weight of the image data being displayed can also cause a change in the light output. For instance, if the image data being displayed is associated with the least significant bit, then it may be necessary to implement a negative pulse by dropping the light output by one-half or three-quarters.

Furthermore, when the color filter changes state, for example, when the color wheel rotates from a first color to a second color, or when the output of the light source is changing, there is a period of time when the output of the color filter may not have the desired chromatic characteristics for a sufficient duration. During this time, it can be possible to blank out the display so that no image data is being displayed. Alternatively, it can be possible to display portions of bit planes of the image data. For example, if during the color filter state change, there is adequate time to display 10% of a certain weight of a bit plane, the 10% of the bit plane can be displayed during the state change and then the remaining 90% of the bit plane can be displayed at a later time.

After changing the light output, the light modulators can be set based upon the image data being displayed (block 510). The image data can then be displayed onto a display plane for viewing purposes. A check can then be made to determine if there is to be more image data to be displayed that will not require a change to the light output (block 515). If there is more image data to be displayed, then the light modulators can be set based upon the additional image data (block 510). Although there may be additional image data that can be displayed without changing the light output, it may be desired to change the light output in order to display other image data to maximize image quality, for example. Once there is no more image data that can be displayed without changing the light output (block 515), a check can be made to determine if there is more image data to be displayed (block 520). If there is more image, data to be displayed, the light output may be adjusted (block 505) and the additional image data can be displayed (block 510). The sequence of events 500 can continue until there is no longer any image data to be displayed, the display system is powered off or reset, or so on.

Figure 5B:
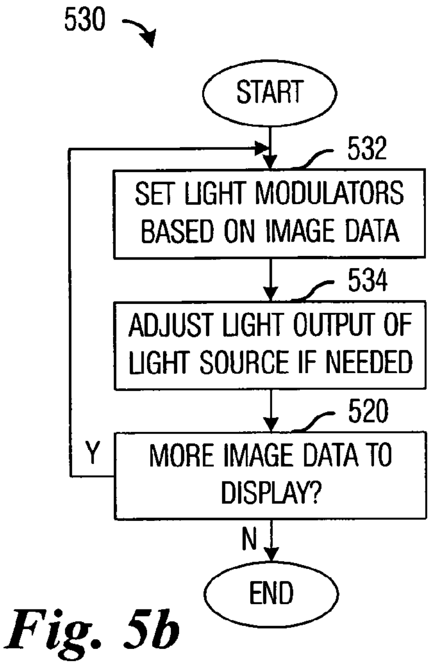

With reference now to FIG. 5*b*, there is shown a diagram illustrating a sequence of events 530 in the displaying of image data in a display system with a variable light source, according to a preferred embodiment of the present invention. The sequence of events 530 illustrates an alternate embodiment of the present invention. Rather than waiting to make an adjustment to the light output of the light source, the light modulators in the array of light modulators can be set based on the image data to be displayed (block 532) prior to the adjusting of the light output of the light source if needed (block 534).

Figure 5C:
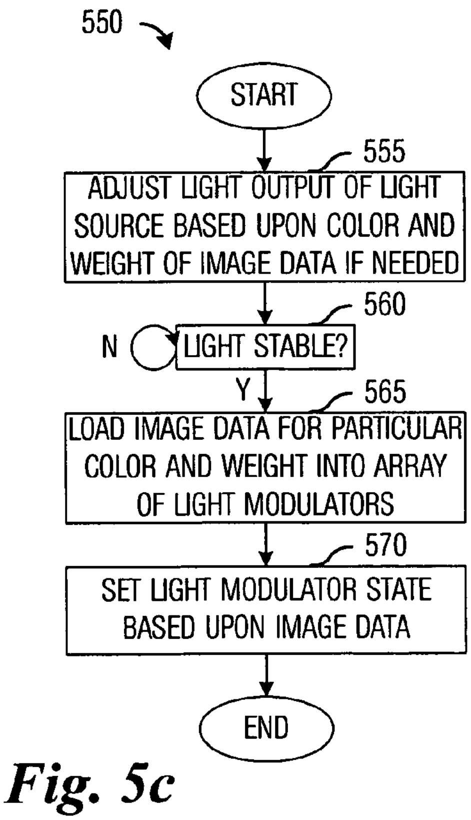
Figure 5D:
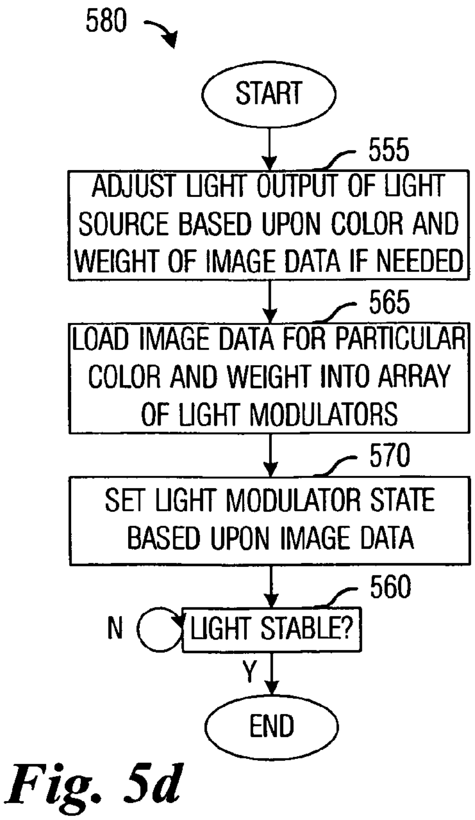

With reference now to FIGS. 5*c* and 5*d*, there are shown diagrams illustrating sequences of events 550 and 580 in the displaying of image data in a display system with a variable light source, according to a preferred embodiment of the present invention. The sequences of events 550 and 580 can describe the events taking place in the displaying of image data in a display system that utilizes a variable light source, as shown in block 505 and block 510 of FIG. 5*a* and block 532 and block 534 of FIG. 5*b*, in greater detail.

The sequence of events 550 can begin with an adjustment of the light output of the variable light source, if a change is needed (block 555). Once a change in the light output is initiated, it may be necessary to wait for the light output to become stable (block 560). Lamps may require a finite amount of time to change output levels and if the display of image data is attempted before the light output stabilizes, image quality can suffer. Some lamps may stabilize faster than others. For example, LEDs and lasers can become stable on the order of microseconds, while arc lamps may require milliseconds (or more) before becoming stable. The sequence of events 550 illustrates an embodiment wherein the image data may be loaded into the array of light modulators after the light becomes stable (block 565) and once the image data is loaded, the light modulators in the array of light modulators can be set into states dependant upon the image data (block 570). In an alternate embodiment of the sequence of events 550, the image data can be loaded into the array of light modulators while the light becomes stable. Although the image data is loaded into the array of light modulators before the light becomes stable, the light modulators in the array of light modulators do not change state until the light becomes stable. This alternate embodiment enables the hiding of latency involved in the loading of image data into the array of light modulators with the time required in waiting for the stabilization of the light output of the light source.

The sequence of events 580 illustrates an embodiment wherein the image data may be loaded into the array of light modulators (block 565) prior to the light becoming stable (block 560). Additionally, the light modulators in the array of light modulators change state (block 570) based upon the image data before the light output of the light source becomes stable. This embodiment of the present invention enables the display of the image data for a portion of the image data's total display time during a time that would otherwise be unused. As discussed previously, it is possible to display image data prior to the light output of the light source becoming stable (block 560). This can be achieved by displaying the least significant bit planes or portions of more significant bit planes and then displaying the remainder of the bit plane after the light output becomes stable.

When rapid switching light sources are used in a display system, such as LEDs or lasers, the switching time of the light source can be less than or on the order of the light modulator switch time, and it is possible to sequence the switching of the light source so that by the time the light modulator stabilizes, the light source is stable. This may require that the light modulators change state prior to adjusting the light output of the light source.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of displaying an image, the method comprising:

generating a first intensity light with a variable light source;

illuminating a digital micromirror device with the first intensity light in a first color;

loading image data for a first bit weight of the first color onto the digital micromirror device;

setting the digital micromirror device based on the first bit weight of the first color to modulate the first intensity light to project onto a display plane;

generating a second intensity light with the variable light source;

illuminating the digital micromirror device with the second intensity light in a second color;

loading image data for the first bit weight of the second color onto the digital micromirror device;

setting the digital micromirror device based on the first bit weight of the second color to modulate the second intensity light to project onto the display plane;

loading image data for a second bit weight of the first color onto the digital micromirror device;

setting the digital micromirror device based on the second bit weight of the first color to modulate the first intensity light to project onto the display plane;

loading image data for the second bit weight of the second color onto the digital micromirror device; and setting the digital micromirror device based on the second bit weight of the second color to modulate the second intensity light to project onto the display plane.

2. The method of claim 1, further comprising:

generating a third intensity light with the variable light source;

illuminating the digital micromirror device with the third intensity light in a third color;

loading image data for the first bit weight of the third color onto the digital micromirror device; and setting the digital micromirror device based on the first bit weight of the third color to modulate the third intensity light to project onto the display plane.

3. The method of claim 1, wherein the loading image data for the second bit weight of the first color and the setting the digital micromirror device based on the second bit weight of the first color are performed between the generating the first intensity light with the variable light source and the generating the second intensity light with the variable light source.

4. The method of claim 1, wherein the variable light source comprises a light emitting diode or laser, wherein the generating the first intensity light further comprises providing a first drive current level to the variable light source, and wherein the generating the second intensity light further comprises providing a second drive current level to the variable light source.

5. The method of claim 1, wherein the variable light source is a wideband light source, wherein the illuminating the digital micromirror device with the first intensity light in the first color comprises filtering the first intensity light with a first color filter, and wherein the illuminating the digital micromirror device with second intensity light in the second color comprises filtering the second intensity light with a second color filter.

* * * * *

UNITED STATES PATENT AND TRADEMARK OFFICE

CERTIFICATE OF CORRECTION

PATENT NO. : 7,623,286 B2
APPLICATION NO. : 11/361247
DATED : November 24, 2009
INVENTOR(S) : Vestal et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 555 days.

Signed and Sealed this

Fourteenth Day of December, 2010

David J. Kappos
*Director of the United States Patent and Trademark Office*